Patented Nov. 7, 1950

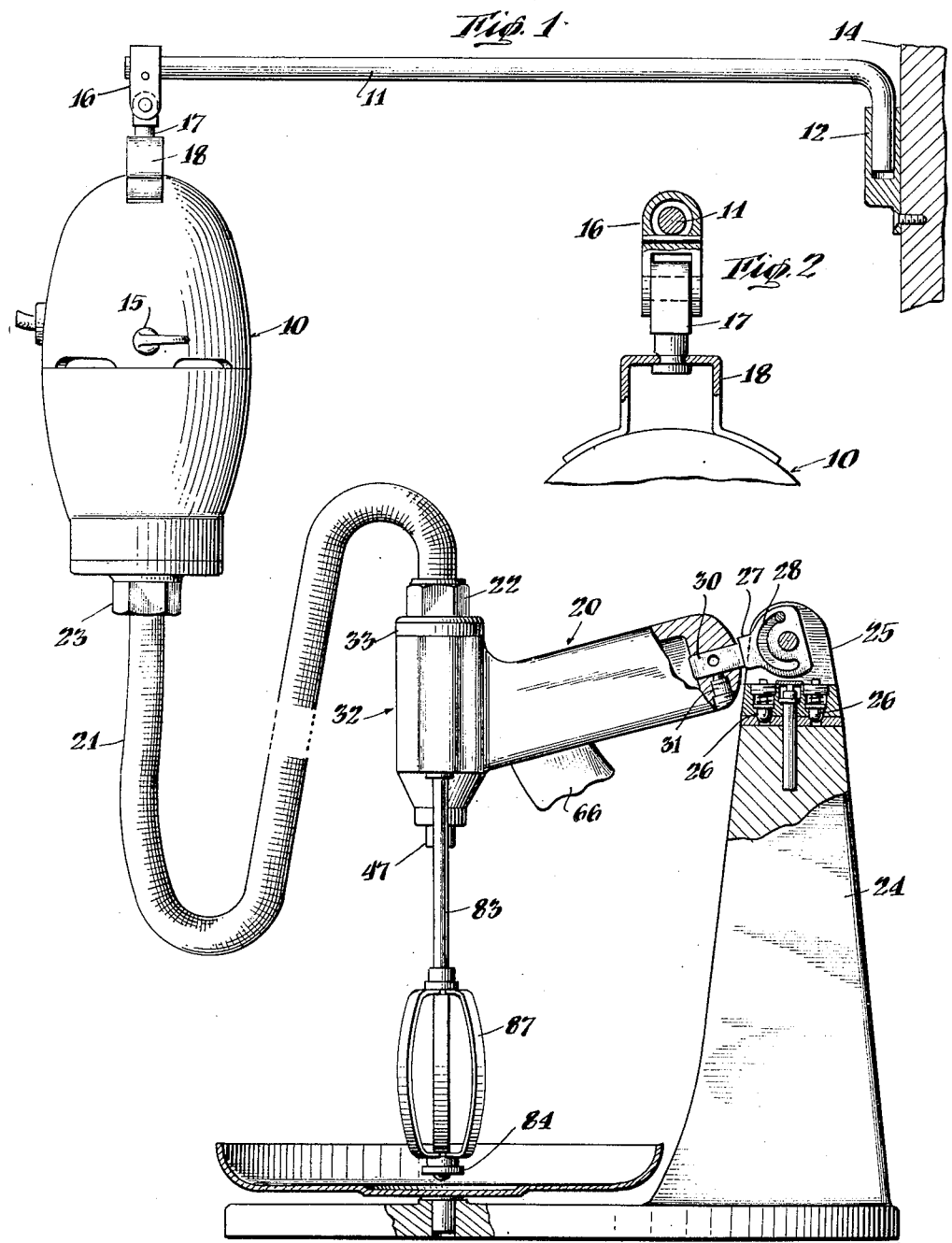

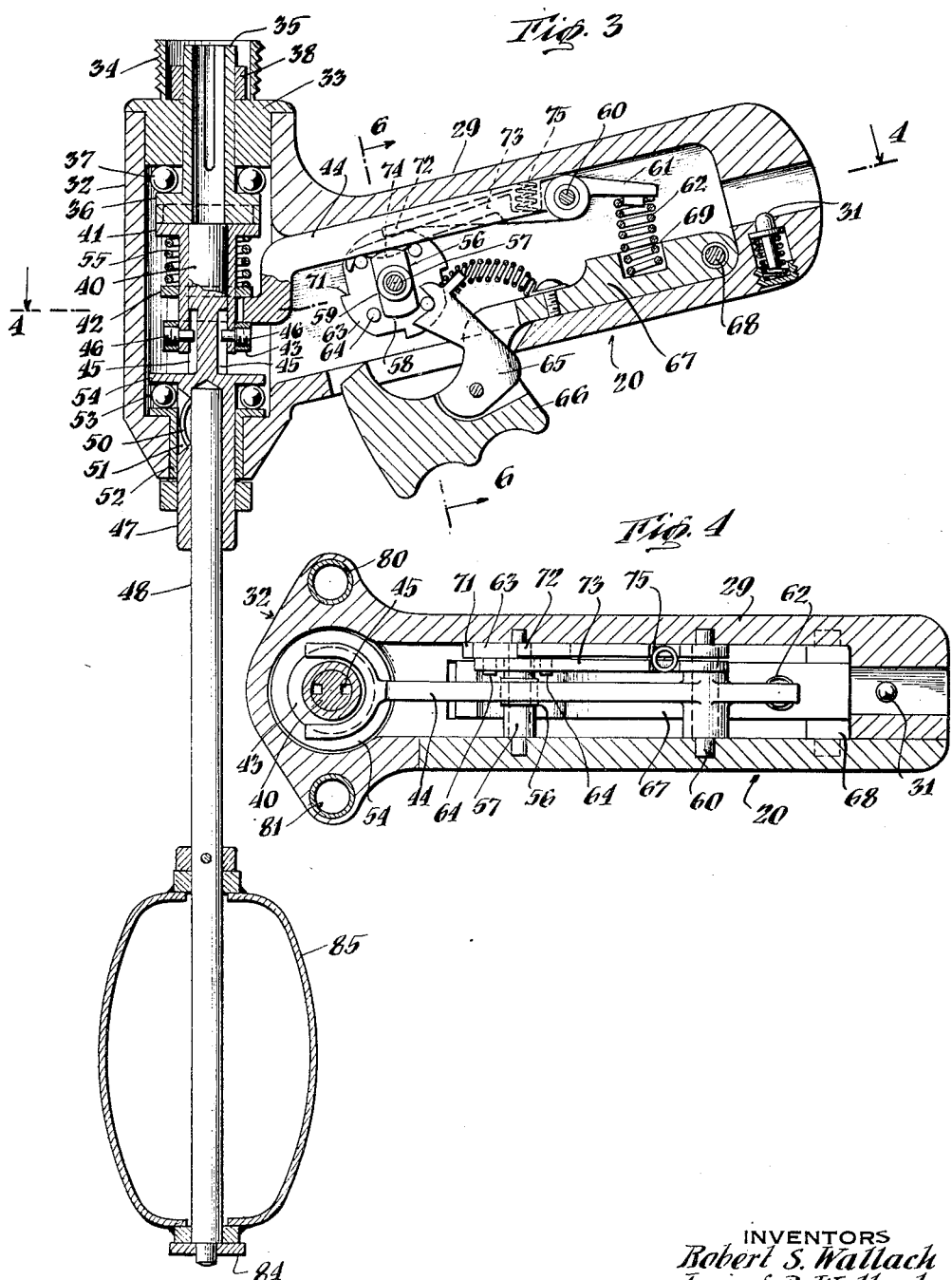

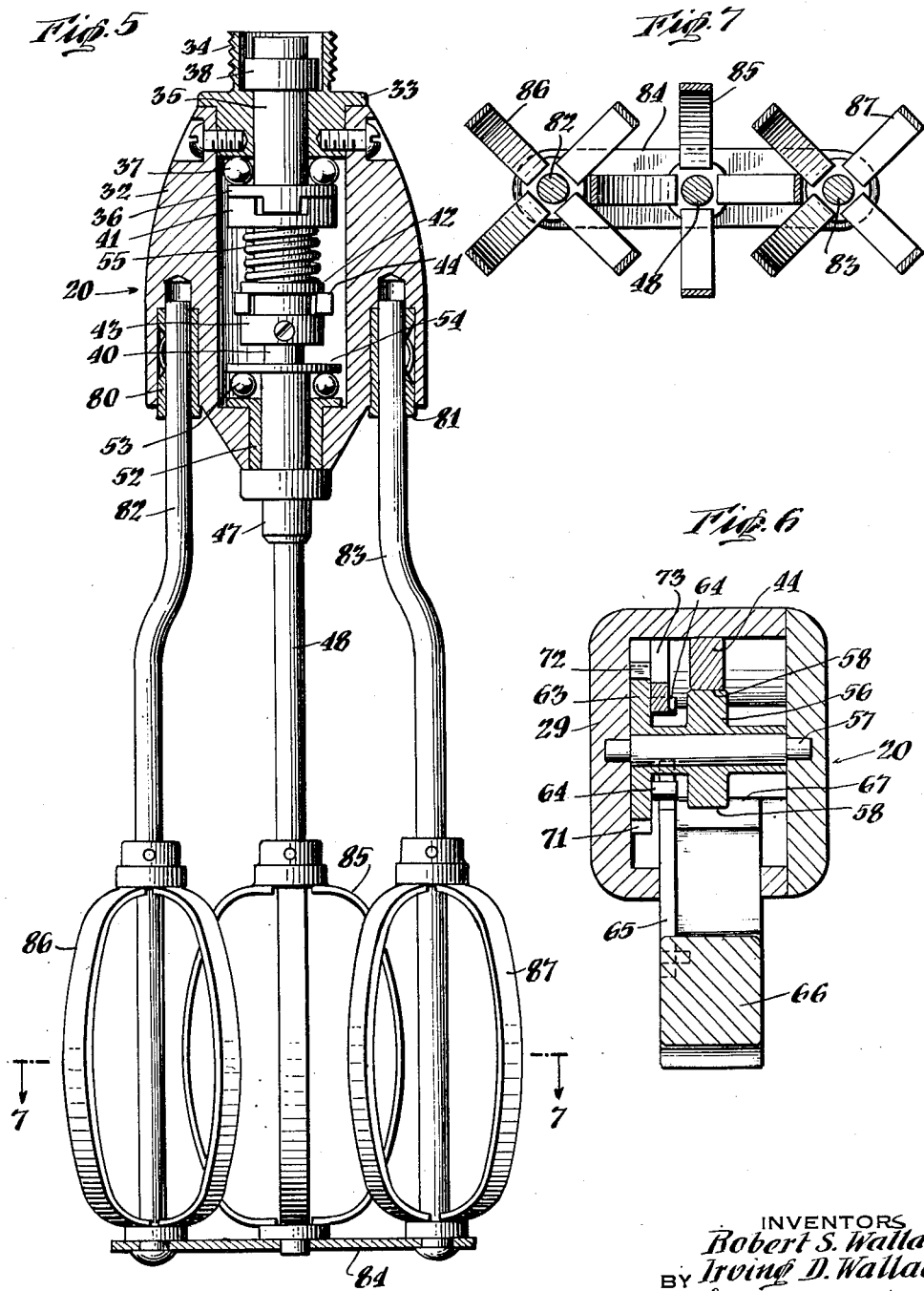

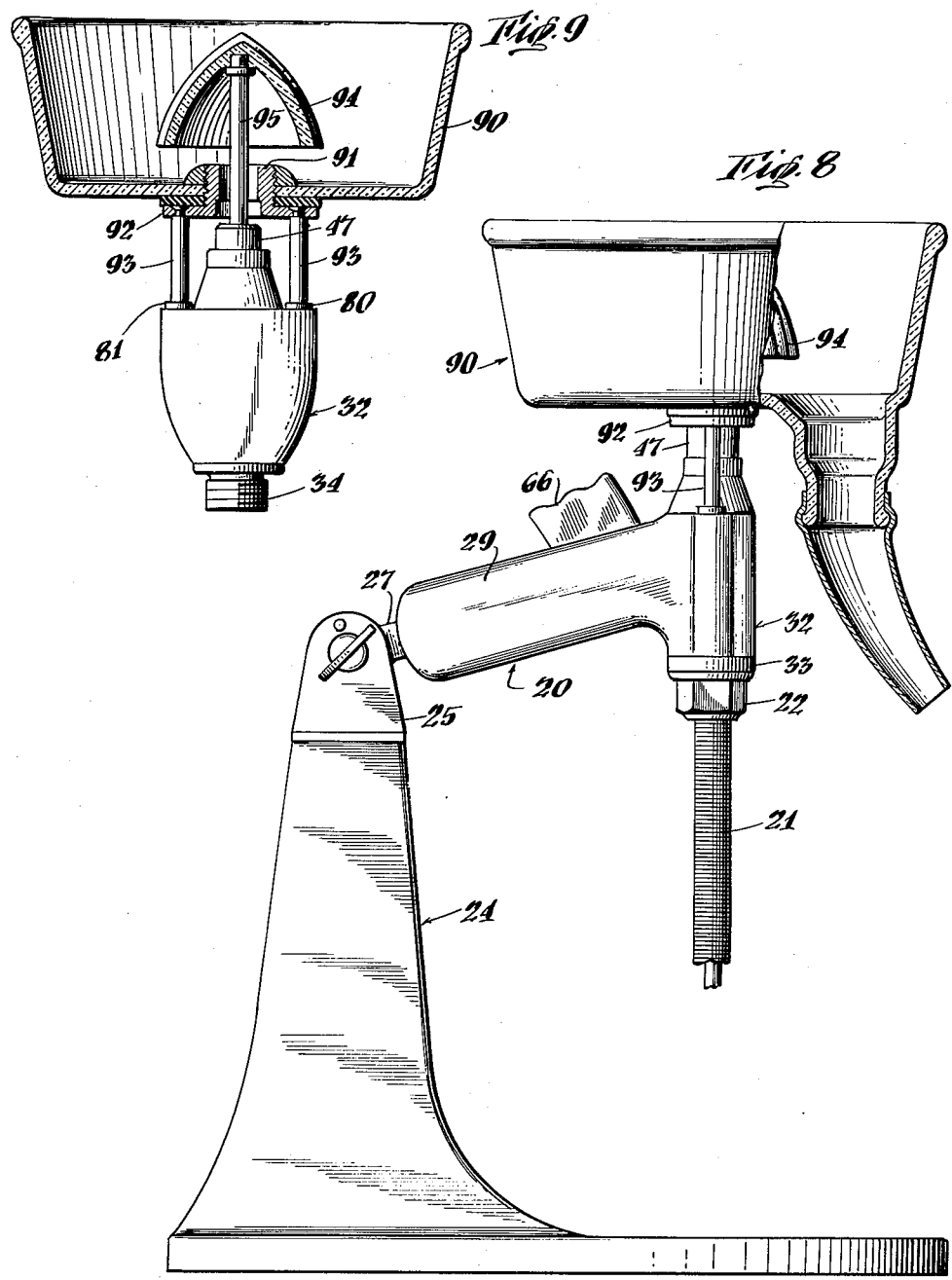

2,529,120

UNITED STATES PATENT OFFICE 2,529,120

SUPPORT FOR ELECTRIC FOOD MIXERS OR THE LIKE

Robert S. Wallach, Madison, N. J., and Irving D. Wallach, Port Washington, N. Y., assignors to Associated Development & Research Corporation, New York, N. Y., a corporation of New York Application December 19, 1946, Serial No. 717,294

2 Claims. (Cl. 248—121)

1

This invention relates to a domestic appliance for the operation of power driven tools such as food mixers, fruit juicers, sharpening and buffing wheels and the like, and has for a principal object to provide an improved and conveniently used assembly which includes an electric motor, an improved clutch-provided tool mount which may be optionally held in the hand or adjustably affixed to a support during the use of the appliance, and flexible shaft means mechanically connecting the motor and the tool mount.

It is another object of the invention to provide a tool handle for such an appliance, which includes an improved clutch by means of which the operation of the mixers or the other tools may be controlled independently of the motor switch.

It is an object of the invention to provide a tool handle by means of which a power driven tool may be conveniently held, said handle having an improved clutch with which to connect or disconnect the tool with the power source by finger pressure on an externally accessible finger piece.

It is an additional object of the invention to provide a clutch provided tool mount for a motor driven tool; the cooperating clutch parts being so arranged that when the motor is idling it is subjected to a minimum of frictional drag.

Further objects are to provide a tool mount for a power driven tool having a clutch assembly which, when the clutch is disengaged, introduces a positive braking action to stop the rotation of the tool with minimum of overrun and in which a single beater tool, or multiple beater tools, may be employed according to the preference of the user or the requirements of the work being done.

Other features and advantages of the invention will hereinafter appear from the following detailed description of a preferred embodiment of the invention.

In the accompanying drawings:

Fig. 1 is a side elevation partly in section, showing a complete device pursuant to the present invention, said device being set up for use as a mixer or beater;

Fig. 2 is a detail, partly in section, of the swivel mount for attaching the motor to a supporting arm;

Fig. 3 is a vertical elevation, in central section, of the tool mount, said mount having attached thereto a mixer or beater;

Fig. 4 is a plan section taken on lines 4—4 of Fig. 3;

Fig. 5 is a vertical elevation, in section, showing a tool mount to which has been attached auxiliary beaters for cooperation with a central power driven beater;

Fig. 6 is a transverse sectional view taken along lines 6—6 of Fig. 3;

Fig. 7 is a section through the beater heads, looking in the direction of the lines 7—7 of Fig. 5;

Fig. 8 is a vertical elevation, partly in section, of the apparatus when used as a fruit juicer; and Fig. 9 is a front elevation, taken in section through a reamer to illustrate the means whereby the bowl of the fruit juicer is supported upon the tool mount.

Referring to the drawings, the apparatus includes a motor 10 which is swivelly hung from an extension arm 11 adapted to be supported by means of the socket 12 to a vertical wall surface 14. As is conventional, the motor has a control switch 15 with which preferably is associated the usual rheostat (not shown) by means of which motor speeds may be controlled. As is well known, different motor speeds are employed for beating, whipping, fruit juicing, and other domestic tasks and it is intended that a dial or the like shall be placed concentric with the switch 15 so as to guide the user in the selection of the proper operating speed.

The motor may be swivelly hung by means of a saddle 16 secured to the end of the arm 11 so as to permit it to swing thereon, said saddle 16 securing a pivoted stud 17 which rotatably engages a strap 18 affixed to the motor casing.

A tool mount 20 is drivingly associated with the motor by means of a flexible drive shaft 21, said drive shaft being secured respectively to the motor and to the tool mount by means which include the attachment nuts 22, 23.

The tool mount is arranged for detachable association with a stand which includes a support 24. Said support has a head 25 rotatably secured thereon, and said head includes one or more catches 26 which cooperate with apertures formed in the support 24 so as to releasably lock the said head in variant angular positions. Preferably said head 25 is bifurcated to receive a swing arm 27 which is permitted to rotate through 180 angular degrees as provided by a slot 28. The end 30 of the swing arm rotatably fits within a socket provided in the end of the tool mount 20. As appears in Fig. 1, the tool mount has a detent 31 whereby said mount may be releasably held in one of several positions on the swing arm 27.

The tool mount may be detached from the stand when desired, as when using a tool such as a pot scourer or when beating or mixing materials cooking on a stove, and the mount therefore includes a handle 29 to be easily held by the user.

Referring now to Fig. 3, it will be seen that the tool mount is hollow, and has, at one end, a clutch housing portion 32. A side wall of the handle is removable to permit access to the interior for assembly of the component elements. The upper end of the housing 32 is closed by a plug 33 having threaded sleeve 34 which receives the securement nut 22 of the drive shaft assembly. The plug has an axial aperture through which extends a freely rotatably hollow shaft 35 which terminates in a clutch jaw 36. The shaft has an internal keyway for cooperation with a spline or the like provided on the end of the flexible shaft. Any suitable antifriction bearing 37 may be interposed between the upper face of the clutch jaw 36 and the plug 33. A collar 38, freely rotatable within sleeve 34, is secured to the shaft 35 to limit axial displacement thereof.

It is preferable that the clutch be of the positive jaw type, and therefore slidably carried upon a shaft 40 is a cooperating clutch member 41 which has jaws to fit within slots provided in the cooperating face of the clutch element 36. Fig. 3 shows the clutch in engaged position.

A pair of cooperating collars 42, 43 which are carried upon the cylindrical neck of the clutch member 41 confine the forked end of a clutch lever 44 therebetween. It will be noted that the shaft 40 has dimetrically opposite splines 45, and pin members 46 extend through the collar 43 to enter the said splines. The end of the shaft 40 terminates in a socket 47 which receives the end of the tool shaft 48. Desirably said tool shaft has a spring 50 fixed thereon, said spring snapping within a slot 51 in socket 47 to retain the tool shaft therein. A bushing 52 has an upper flange which forms a lower race for a ball bearing 53, the upper race being provided by a collar 54 which may be formed as an integral part of the shaft 40. The upper surface of said collar 54 is preferably machined smooth for cooperation with the lower surface of the collar 43 to provide a braking surface when the clutch is in disengaged position. A coil spring 55 disposed about the collar of clutch member 41 urges the latter toward the clutch element 36 so that the two clutch portions will be brought into mating engagement.

To throw the clutch lever 44 into engaged or disengaged position, there is provided a cam 56 carried by or formed upon a shaft 57 journaled in bearings in the side walls of the handle 29. Said cam has two equal radius arcuate ends 58 and two diametrically opposite parallel flats 59. As the cam is rotated counterclockwise, there will be no movement of lever 44 until a flat 59 comes into position, whereupon said lever will be free to throw the clutch into disengage position. Lever 44 is pivoted on a shaft 60, and an extension 61 of said lever is urged by a coil spring 62 into counterclockwise rotation.

Fixed upon shaft 57 is a disc 63, which has four equi-angularly spaced pins 64 extending therefrom. Said pins cooperate with a spring biased pawl 65 pivotally carried by a fingerpiece 66 formed on the main shaft-lever 67 pivoted internally of the handle, as on the shaft 68. The coil spring 62 fits within a socket 69 in lever 67, and thus serves both the clutch-throw lever 44 and the shift lever 67. It is apparent therefore that when the fingerpiece 66 is pressed the pawl 65 will urge the disc 63 into counterclockwise rotation. The mechanical relationship of the pawl and the pins 64 is such that a complete movement of the fingerpiece 66 will effect a 90 degree rotation of the disc, although as later explained, a partial movement of the fingerpiece sets up forces which complete the movement of the disc. To prevent backward rotation of the disc as the fingerpiece 66 returns to original position, there are provided four notches 71 about the periphery of the disc, and said notches cooperate with a detent 72 pivotally carried upon the shaft 60. To assist in the rotation of the disc 63 and to correctly establish the shifted position thereof, there is provided a lever 73, also pivotally mounted by the shaft 60, and having an arcuate head 74 which fits between adjacent pins 64 as clearly appears in Fig. 3. The configuration of the head is such that when it is in home position, the disc 63 has been rotated precisely 90 degrees. As is shown in Fig. 4, the respective levers 72 and 73 are immediately adjacent, and are formed to have a joint pocket within which a common coil spring 75 is received.

When lever 67 is rotated upwardly, the disc 63 begins its rotation, and coil spring 62 compresses. Lever 73 lifts against the tension of spring 75 because of the camming effect of the pin 64 against the arcuate head 74. However, lever 44 does not immediately move because of the equi-radial arc 58 then in contact with it. At the overthrow stage, as flat 59 comes into position, springs 62 and 75 have substantial stored energy, and complete the rotation of disc 63 with a snap action. The clutch lever 44 then comes smartly into declutching position.

It will be noted that substantially all of the friction-creating elements of the clutch members are on the driven side of the clutch. When the cam 56 has been brought to clutch-disengagement position and the clutch jaws have separated, the clutch member 36 forms the only load on the then-idling motor, which therefore has a minimum of frictional drag. As the clutch lever 44 throws the clutch assembly downwardly, the surfaces of the collars 43 and 54 will come into engagement to exert a braking action which will almost immediately halt further rotation of the tool shaft 48. Preferably, the downward movement of collar 43 is so related to the ratio of the radius of cam arc 58 to the spacing of flat 59 from the center of cam rotation that the lever 44 is supported slightly above the cam flat when the aforesaid braking action occurs, and thus coil spring 62 is effective to press the braking surfaces together to improve the braking action.

Referring now to Fig. 5, the clutch-housing 32 provides a pair of sockets 80, 81 which are preferably disposed in line with the shaft extension 47 which receives the shaft 48 of the power driven tool. When the tool 48 is a beater, as shown in Fig. 5, the sockets 80, 81 may be used to receive the ends of the shafts 82, 83 of a pair of idler beaters which are freely rotatable on said shafts and which are rotatably mounted on yoke 84. The respective heads 85, 86, 87 of the beaters are formed from curved strips joined at their upper and lower ends to suitable collars, as shown. Said strips are preferably ellipsoidal, in that they are curves of constantly changing radius. The central beater head 85 mechanically meshes with the adjacent heads 86, 87, and it has been found that the ellipsoidal configuration provides the most efficient shape for driving the idler beaters from the central beater head 85. It has also been found that a center to center relationship of the major axes of adjacent ellipses to the minor diameter of the respective ellipses should be of the order of from 60 to 70 per cent for most efficient operation. For example, in a preferred embodiment of the invention the minor diameter of each ellipse is 1¾ inches and the major axes of the respective ellipses are 1 3/32 inches on centers. The ellipsoidal shape of the beater heads and the spacing ratio above expressed is believed by us to be novel and constitutes an important feature of the present invention.

It will be understood that although the axes of the respective beater heads are shown in alignment, they may be angularly related, in which event loke 84 would be V-shaped or triangular. Such configuration would compact the auxiliary beater assembly.

The tool mount may be swung or rotated on the stand 24 for use with other tools, such as a sharpening wheel, buffing wheel or the like. When the tool mount is swung completely over so that the socket 47 is vertical, a fruit juicer bowl 90 may be placed on the tool mount. The bowl 90 has a sleeve 91 providing an axial aperture and having a flange 92 which secures a pair of short rods 93 which fit within the sockets 80, 81 in the clutch housing 32 to support the bowl 90. The reamer 94 has a shaft 95 which enters the drive socket 47 for rotation therewith.

Although the invention has been described with particular reference to a domestic appliance, it is obvious that it is a useful appliance for any purpose where a light-duty mixing, sanding or grinding machine is needed.

Although the invention has been described by making a fully detailed reference to the certain presently preferred embodiments, such detail of description is to be understood in an instructive rather than a limiting sense, many changes being possible within the scope of the claims hereto appended.

We claim:
1. In an apparatus of the character described, a tool mount for a power driven tool comprising a handle having a portable tool-receiving socket, means for driving said socket from an external power source, a support for said tool comprising a standard, a head swivelly mounted thereon, an extension associated with said head and releasably engaging with the handle of said tool, detent means associated with said standard and head and engageable to optionally secure said handle at one of several angular positions about the periphery of said standard.

2. In an apparatus of the character described, in combination a standard, an extension rotatably mounted thereon, detent means cooperating with said extension and standard to retain the former in one of several positions to which it may be rotated with respect to the latter, a motor driven tool socket, a handle for supporting said socket, and means for releasably connecting said handle with said extension.

ROBERT S. WALLACH.
IRVING D. WALLACH.

REFERENCES CITED

The following references are of record in the file of this patent:

UNITED STATES PATENTS

| Number | Name | Date |
|---|---|---|
| 386,105 | Bryant | June 17, 1888 |
| 1,399,296 | Feeney | Dec. 6, 1921 |
| 2,061,868 | Fitzgerald | Nov. 24, 1936 |
| 2,103,922 | Van Guider | Dec. 28, 1937 |
| 2,187,636 | Story | Jan. 16, 1940 |
| 2,246,517 | Holister | June 24, 1941 |
| 2,267,424 | Roos | Dec. 23, 1941 |
| 2,372,397 | Sheroff | Mar. 27, 1945 |